United States Patent
Yoshitake et al.

(12)

(10) Patent No.: US 8,775,117 B2
(45) Date of Patent: Jul. 8, 2014

(54) ENCODER, SERVO UNIT, AND METHOD INCLUDING CALCULATING POSITION DATA

(75) Inventors: Hironobu Yoshitake, Fukuoka (JP); Jirou Muraoka, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 372 days.

(21) Appl. No.: 13/240,307

(22) Filed: Sep. 22, 2011

(65) Prior Publication Data

US 2012/0116715 A1 May 10, 2012

(30) Foreign Application Priority Data

Nov. 5, 2010 (JP) .............................. P. 2010-248286

(51) Int. Cl.
- G06F 15/00 (2006.01)
- G01D 5/244 (2006.01)
- G01D 5/245 (2006.01)
- H02P 23/00 (2006.01)

(52) U.S. Cl.
CPC ........ G01D 5/24471 (2013.01); G01D 5/24409 (2013.01); G01D 5/2451 (2013.01); H02P 23/0045 (2013.01)
USPC .................. 702/150; 250/559.29; 324/207.18; 341/116; 702/89

(58) Field of Classification Search
CPC .......... G01D 5/24471; G01D 5/24476; G01D 5/24404; G01D 5/24409; G01D 5/2451; G01D 5/34776; G03F 7/70725; G03F 7/70058; G03F 7/7035; E01C 11/005; G02F 1/133516; H02P 23/0045
USPC ........... 702/85, 125, 126, 142, 145, 149, 150, 702/151, 189, 89; 341/116; 324/207.18; 369/47.17; 250/559.29
See application file for complete search history.

(56) References Cited

U.S. PATENT DOCUMENTS

| | | | | |
|---|---|---|---|---|
| 5,382,899 A | * | 1/1995 | Funatsu et al. | ........... 324/207.18 |
| 5,721,546 A | | 2/1998 | Tsutsumishita | |
| 6,348,695 B2 | * | 2/2002 | Okamuro et al. | ........ 250/559.29 |
| 6,772,078 B2 | | 8/2004 | Uehira | |
| 6,912,476 B2 | | 6/2005 | Huber-Lenk et al. | |

FOREIGN PATENT DOCUMENTS

| | | |
|---|---|---|
| JP | 08-261794 | 10/1996 |
| JP | 2003-121135 | 4/2003 |
| JP | 2004-513357 | 4/2004 |
| JP | 2008-116292 | 5/2008 |

OTHER PUBLICATIONS

Japanese Office Action for corresponding JP Application No. 2010-248286, Oct. 2, 2012.

* cited by examiner

*Primary Examiner* — John H Le
(74) *Attorney, Agent, or Firm* — Mori & Ward, LLP

(57) ABSTRACT

An encoder includes a detector, a first position data calculator, a first data converter, an approximation device and a third position data calculator. The first data converter is configured to convert a first position data calculated by the first position data calculator into second position data whose second width in bits is longer than a first width in bits of the first position data. The approximation device is configured to calculate an approximation function that derives position data when timing data is input, based on a plurality of the second position data converted by the first data converter at a plurality of successive sampling timings, respectively. The third position data calculator is configured to calculate third position data indicating a position of a detection target at an output timing, based on the approximation function calculated by the approximation device.

10 Claims, 6 Drawing Sheets

US 8,775,117 B2

ENCODER, SERVO UNIT, AND METHOD INCLUDING CALCULATING POSITION DATA

CROSS-REFERENCE TO RELATED APPLICATIONS

The present application claims priority under 35 U.S.C. §119 to Japanese Patent Application No. 2010-248286, filed Nov. 5, 2010. The contents of this application are incorporated herein by reference in their entirety.

BACKGROUND OF THE INVENTION

1. Field of the Invention

The present invention relates to an encoder, a servo unit, and a position data calculating method.

2. Description of the Related Art

Encoders are used as devices measuring position data such as rotational angles, line positions, and the like. While the encoders are classified broadly into optical encoders, magnetic encoders, and the like on the basis of the detection principles thereof, each of the encoders converts a detection signal from a detector based on the detection principle thereof into position data using signal processing or the like.

On the other hand, a timing at which the signal processing that generates the position data is executed or a timing at which the detection signal is acquired (also referred to as "sampling timing") is not continued. Accordingly, for example, position data between sampling timings is calculated using extrapolation processing, interpolation processing, or the like, in which a regression line is calculated as described in Japanese Unexamined Patent Application Publication No. 2008-116292.

SUMMARY OF THE INVENTION

According to one aspect of the present invention, an encoder includes a detector, a first position data calculator, a first data converter, an approximation device and a third position data calculator. The detector is configured to detect a detection signal indicating a position of a detection target. The first position data calculator is configured to calculate, at a discrete sampling timing based on the detection signal detected by the detector, first position data that has a first width in bits and that indicates the position of the detection target. The first data converter is configured to convert the first position data calculated by the first position data calculator into second position data whose second width in bits is longer than the first width in bits. The approximation device is configured to calculate an approximation function that derives position data when timing data is input, based on a plurality of the second position data converted by the first data converter at a plurality of successive sampling timings, respectively. The third position data calculator is configured to calculate third position data indicating the position of the detection target at an output timing, based on the approximation function calculated by the approximation device.

According to another aspect of the present invention, a servo unit includes a motor, an encoder and a control device. The motor is configured to move a detection target. The encoder is configured to detect a position of the detection target moved by the motor. The control device is configured to control the motor based on position data detected by the encoder. The encoder includes a detector, a first position data calculator, a first data converter, an approximation device and a third position data calculator. The detector is configured to detect a detection signal indicating the position of the detection target. The first position data calculator is configured to calculate, at a discrete sampling timing based on the detection signal detected by the detector, first position data that has a first width in bits and that indicates the position of the detection target. The first data converter is configured to convert the first position data calculated by the first position data calculator into second position data whose second width in bits is longer than the first width in bits. The approximation device is configured to calculate an approximation function that derives position data when timing data is input, based on a plurality of the second position data converted by the first data converter at a plurality of the successive sampling timings, respectively. The third position data calculator is configured to calculate third position data indicating the position of the detection target at an output timing, based on the approximation function calculated by the approximation device.

According to further aspect of the present invention, a position data calculating method includes: detecting a detection signal indicating a position of a detection target; calculating, at a discrete sampling timing based on the detection signal, first position data that has a first width in bits and that indicates the position of the detection target; converting the first position data into second position data whose second width in bits is longer than the first width in bits; calculating an approximation function that derives position data when timing data is input, based on a plurality of the second position data at a plurality of the successive sampling timings, respectively; and calculating third position data indicating the position of the detection target at an output timing, based on the approximation function.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
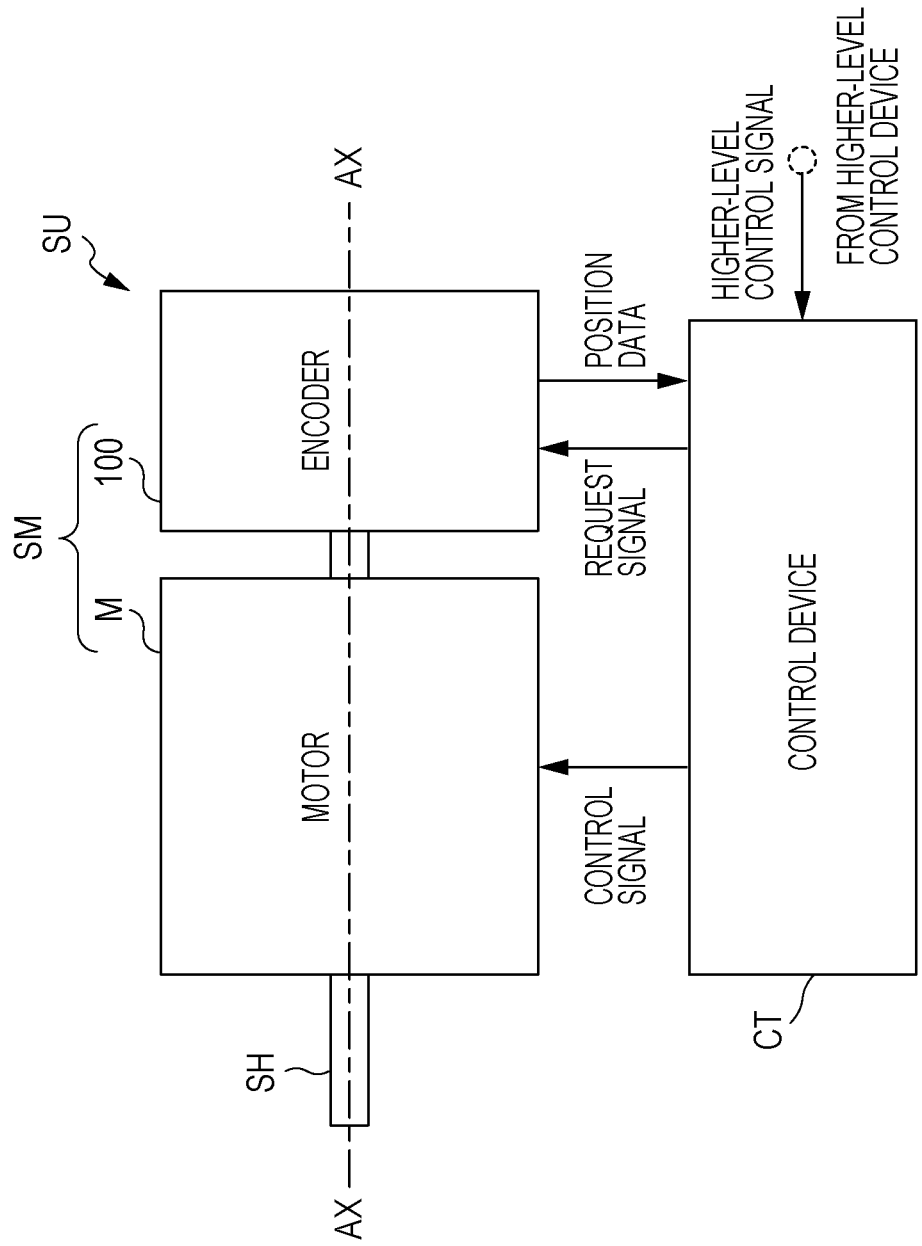
FIG. 1 is an explanatory diagram for explaining a configuration of a servo unit according to a first embodiment of the present invention.

The embodiments will now be described with reference to the accompanying drawings, wherein like reference numerals designate corresponding or identical elements throughout the various drawings.

Note that, in this specification and the appended drawings, structural elements that have substantially the same function and structure are denoted with the same reference numerals, and repeated explanation of these structural elements is omitted.

Before an encoder and the like according to individual embodiments of the present invention are described, the summary of processing performed in an encoder to which the embodiment relates will be described.

Using a predetermined detection principle (for example, an optical principle, a magnetic principle, a mechanical principle, or the like), the encoder converts, into a detection signal, the position of a motor (the position of a target (for example, a shaft or the like) driven by the motor), which is an example of the detection target of a position. In addition, the encoder converts the detection signal into position data on the basis of predetermined signal processing.

On the other hand, in the process of signal processing in which the position data is processed within the encoder, processed data is treated as digital data at least partially. For example, with respect to the digital data, the "type (also referred to as data type)" thereof is determined, and the digital data is processed on the basis of the data type thereof. The data type specifies a width in bits (also referred to as data length), which is the number of bits of data of 1, and whether or not the data includes a decimal point or a sign, and the like.

For example, when a programming language such as a C language or the like is used, the data type of an integer number whose width in bits is a 16-bit width and that is unsigned is an unsigned short integer type (unsigned short int), and the data type of an integer number whose width in bits is a 32-bit width and that is unsigned is an unsigned long integer type (unsigned long int). In addition, the data type of an integer number whose width in bits is a 16-bit width and that is signed is a signed short integer type (signed short int), and the data type of an integer number whose width in bits is a 32-bit width and that is signed is a signed long integer type (signed long int).

In addition, a range in which data of each data type is available is determined on the basis of the width in bits thereof. For example, the value of data of the unsigned short int ranges from 0 to 65535, and the value of data of the unsigned long int ranges from 0 to 4294967295.

In addition, when the data type is a signed type, a range in which the data is available different from a signed data type because a most significant bit (MSBit) indicates a sign. For example, the value of data of the signed short int ranges from −32768 to 32767, and the value of data of the signed long int ranges from −2147483648 to 2147483647.

In addition, in each signal processing circuit, regardless whether the circuit is a physical circuit or a circuit processed as software, the data type of data processed in the circuit is predetermined, and each data is treated as data whose bit number is based on the type thereof.

On the other hand, data indicating a position in the encoder successively changes in response to the change of the position. In this case, in the encoder, sampling timings such as the detection timing of the detection signal indicating the position, a processing timing at which the position data is calculates from the detection signal, and the like are temporally spaced. Accordingly, in some case, in order to output the position data at a desired output timing, an approximation function is obtained from the position data calculated at a past sampling timing, and the position data at the desired output timing is calculated from the approximation function.

However, the range of a value indicated by the position data subjected to digital processing is limited by the data type as described above. As a result, data arranged in chronological order not only monotonically increases or decreases but also is largely spaced when the data exceeds the upper limit or lower limit of the range thereof, and the data exhibits a behavior departing from the monotonic increase or decrease (for example, in the case of the unsigned short int, when the data increases from the upper limit value of 65535 by 1, the data turns out to be 0). The behavior interferes with obtaining an approximation function or the like from data continuing in chronological order.

The encoder or the like according to each embodiment of the present invention can adequately inhibit excessive elongation occurring owing to the limit value of the position data, which causes such interference, and generate more accurate position data. In this regard, however, the advantageous effect of the encoder according to each embodiment is not limited to this example, and in addition to this, the encoder according to each embodiment will also be as described in detail in the description of each embodiment.

In addition, hereinafter, for the convenience of description, a case will be described in which a servo unit according to each embodiment includes a rotary-type motor, a rotary-type encoder, and the like. However, the present invention is not limited to such an example, and it is additionally remarked that the present invention may also be applied to a linear-type motor and a linear-type encoder or a motor of another type and an encoder of another type, for example. Hereinafter, the encoder and the like according to each embodiment of the present invention will be described in detail.

1. Configuration of Servo Unit

First, the configuration of a servo unit according to a first embodiment of the present invention will be described with reference to FIG. 1. FIG. 1 is an explanatory diagram for explaining the configuration of the servo unit according to the first embodiment of the present invention.

As illustrated in FIG. 1, a servo unit SU according to the present embodiment includes a servo motor SM and a control device CT. In addition, the servo motor SM includes an encoder 100 and a motor M.

The motor M is an example of a power generation source in which the encoder 100 is not included. Although the single body of the motor M is called a servo motor in some cases, it is assumed in the present embodiment that a configuration including the encoder 100 is the servo motor SM. The motor M includes a shaft SH, and outputs a rotation torque from one end portion (output end portion) of the shaft SH by rotating the shaft SH around a rotation axis AX.

In addition, if the motor M is a motor controlled on the basis of position data, the motor M is not limited to a specific motor. In addition, for the convenience of description, hereinafter, a case will be described in which the motor M is an electric motor. However, the motor M is not limited to a case in which the motor M is an electric motor powered by electricity, and the motor M may be a motor utilizing another power source, such as a hydraulic motor, an air motor, a steam motor, or the like, for example.

The encoder 100 is disposed on a measuring end portion of the motor M, located on the opposite side of the output end thereof, and is linked to the shaft SH. In addition, by detecting the position of the shaft SH, the encoder 100 detects the position (also referred to as a rotational angle θ, the position x of the motor M, or the like) of the shaft SH, from which the rotation torque is output, and outputs position data X indicating the position thereof.

The encoder 100 may also output the measured position data to the control device CT constantly or with arbitrary timing. However, for the convenience of description, when acquiring a request signal R from the control device CT, the encoder 100 according to the present embodiment outputs, to the control device CT, the position data X at the timing when the request signal R is acquired (an example of an output timing: also referred to as a request timing tr).

In addition, the disposition position of the encoder 100 is not specifically limited to the example illustrated in the present embodiment. For example, the encoder 100 may also be disposed so as to be directly linked to the shaft SH on an output side, and alternatively the encoder 100 may also be linked to a movable body such as the shaft SH or the like through another mechanism such as a speed reducer, a rotation direction converter, or the like.

As described above, in the present embodiment, the control device CT outputs the request signal R to the encoder 100, and acquires the position data X output from the encoder 100 in response to the request signal R. In addition, the control device CT controls the rotation of the motor M on the basis of the corresponding position data X. Accordingly, in the present embodiment in which an electric motor is used as the motor M, the control device CT controls a current, a voltage, or the like, applied to the motor M, on the basis of the position data, thereby controlling the rotation of the motor M. Furthermore, the control device CT may also acquire a higher-level control signal from a higher-level control device (not illustrated) and control the motor M so that a position or a speed indicated by the corresponding higher-level control signal is output from the shaft SH of the motor M. In addition, when the motor M is a motor utilizing another power source, such as a hydraulic motor, an air motor, a steam motor, or the like, the control device CT can control the rotation of the motor M by controlling these power sources.

2. Configuration of Encoder

Figure 2:
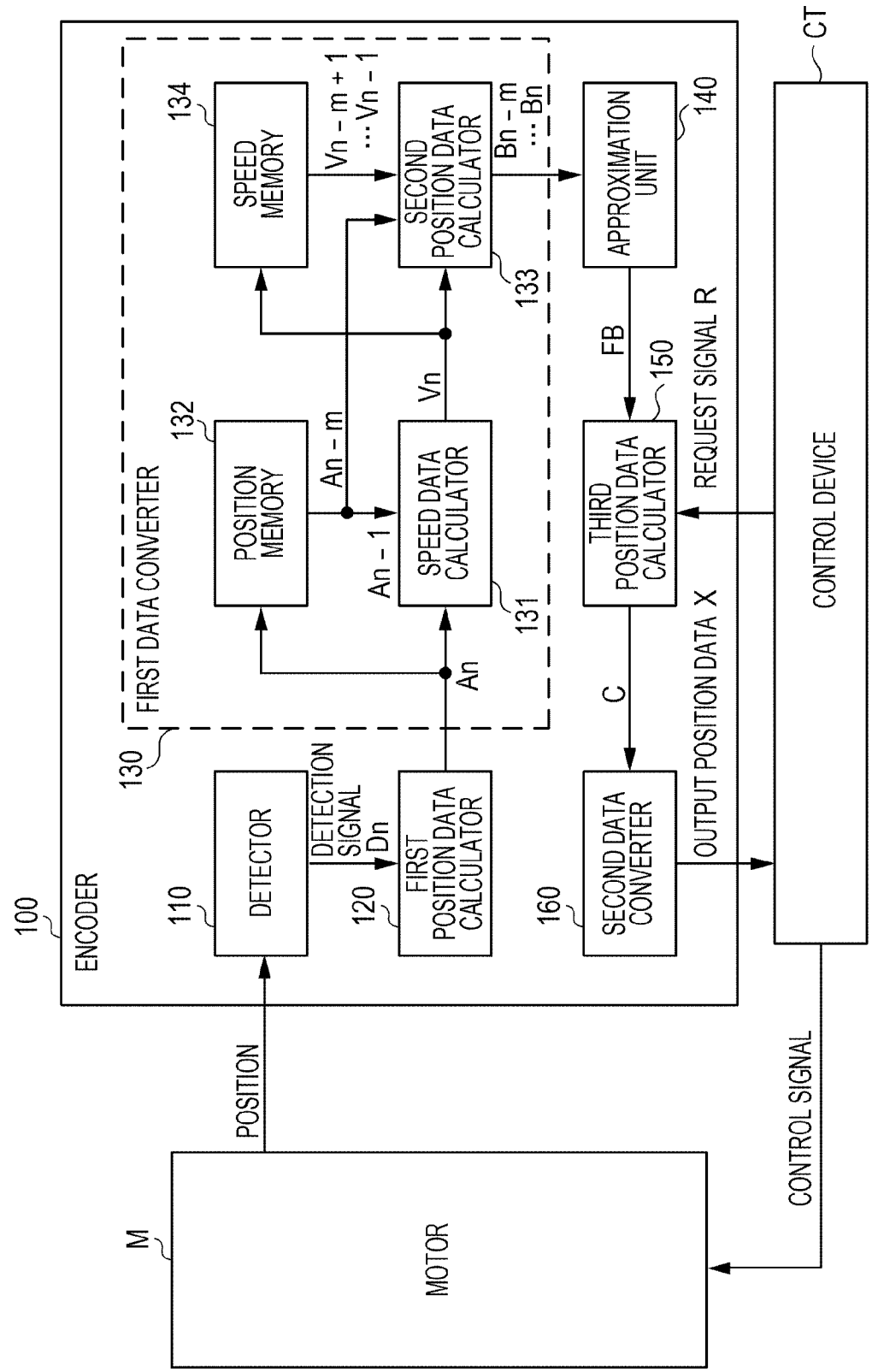
FIG. 2 is an explanatory diagram for explaining a configuration of an encoder according to the embodiment.

Next, the configuration of the encoder 100 according to the present embodiment will be described with reference to FIGS. 2 to 6. FIG. 2 is an explanatory diagram for explaining the configuration of the encoder according to the present embodiment. FIGS. 3 to 6 are explanatory diagrams for explaining processing performed in the encoder according to the present embodiment.

As illustrated in FIG. 2, the encoder 100 according to the present embodiment includes a detector 110, a first position data calculator 120, a first data converter 130, an approximation unit 140, a third position data calculator 150, and a second data converter 160.

Using a mechanical principle, an electrical principle, a magnetic principle, an optical principle, or the like, the detector 110 detects an analog detection signal D (it is assumed that the analog detection signal D at a timing to is a detection signal Dn: n is an integer number) that changes in response to the position of the motor M, from a rotating body or the like linked to the shaft SH of the motor M. In addition, a detection principle based on the detector 110, the type and shape of the detection signal D, and the like are not limited to specific ones.

With respect to a specific example of the configuration of the detector 110, when a case is explained in which optical detection is performed as the detection principle, the description thereof is as follows. Namely, for example, a rotating disk (not illustrated) that includes a plurality of slits transmitting, reflecting, and diffracting light is linked to the shaft SH rotated by the motor M. In addition, a fixed light source irradiates the slits with light, and the light transmitted through the slits is converted into an electrical signal by a light-sensitive element which is also fixed. The electrical signal is output as a detection signal D directly or after being subjected to processing such as amplification or the like. The detection signal D turns out to increase and decrease in accordance with the rotation of the disk, and the increase and decrease thereof indicate the position of the motor M (in this case, correctly, the amount of change in the position). In this regard, however, the detection signal D is not limited to one, and, for example, the detection signal D may also include two signals, a phase difference between which is 90 degrees, so as to detect a rotation direction or also include signals, a phase difference between which is 180 degrees, so as to detect an eccentric error or the like. In addition, the detection signal D may also include an origin signal used for calculating an absolute position or the detection signal D itself may also be a signal indicating the absolute position.

In this regard, however, an example of the configuration, cited here, is just an example of the detector 110, and if a configuration is adopted in which the detector 110 can detect, as the detection signal D, a signal that indicates the position of the motor M and from which the first position data calculator 120 to be described next can calculate position data indicating a position, the configuration is not limited to a specific configuration.

The first position data calculator 120 acquires the detection signal D detected by the detector 110, and calculates, from the detection signal D, position data (the position data is also referred to as "first position data A") indicating the position of the motor M.

A calculation method for the first position data, based on the first position data calculator 120, is not limited to a specific calculation method, and if an example of a calculation method for position data in a case in which the above-mentioned optical principle is used is described, the following method may be cited. Namely, in the above-mentioned example, since the detection signal D detected by the detector 110 is light transmitted through the slits, the detection signal D turns out to be a pulsed or nearly sinusoidal analog signal whose amplitude changes in accordance with the rotation of the disk, for example. Therefore, first, the first position data calculator 120 analog-digital converts the detection signal D. In addition, for example, the first position data calculator 120 subjects the digitalized signal to multiplication processing and increases the frequency thereof, thereby improving a resolution capability. On the other hand, by counting the detection number of signals multiplied after passing through a predetermined reference position, the first position data calculator 120 can calculate the first position data A. For example, as another example of the calculation method for the position data, a method in which an electric angle $\phi$ is calculated by subjecting, to an arctan operation, a division result based on detection signals that are two sine waves having an A phase and a B phase, a method in which detection signals that are two sine waves are converted into an electric angle $\phi$ using a tracking circuit, a method in which an electric angle $\phi$, associated with the values of signals having an A phase and a B phase, is specified in a preliminarily created table, or the like may be cited.

Figure 3:
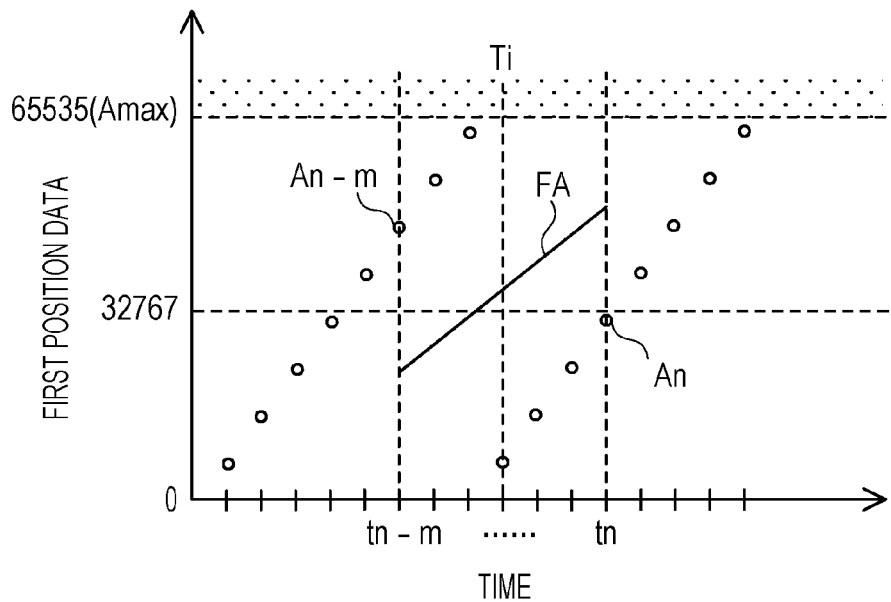
FIG. 3 is an explanatory diagram for explaining processing performed in the encoder according to the embodiment.

The first position data calculator 120 calculates, as digital data of a first width in bits (for example, 16 bits), the first position data A (it is assumed that the first position data A at a timing to is first position data An: n is an integer number). In addition, since the first position data A indicates the position of the motor M, and usually the position is indicated by a positive integer value, the first position data A is calculated on the basis of the data type of an unsigned integer number of the first width in bits in the present embodiment. In this regard, however, the data type of the first position data A is not limited to a specific data type. In FIG. 3, the temporal change of the first position data A is illustrated.

As illustrated in FIG. 3, since the first position data A is data of the first width in bits, the first position data A has a value repeating the increase and decrease thereof ranging from 0 to Amax (from 0 to 65535 in the case of 16 bits) for example, in response to the change of the position of the motor M. In FIG. 3, a case is illustrated in which the motor M rotates at a constant speed in the direction of "1" and hence the first position data A monotonically increases as a time t passes. If the rotation of the motor M is reversed, the first position data A monotonically decreases this time as a time t passes. When the first position data A decreases, it is possible to process the first position data A in the same way as in the case in which the first position data A increases. Therefore, hereinafter, the case in which the first position data A monotonically increases will be cited as an example and described.

In the case of the present embodiment, a case is illustrated in which A=0 corresponds to the reference position of the motor M and the motor M goes into a 360-degree roll and returns to A=0 when exceeding A=Amax. Namely, the first position data A has a value ranging from 0 to Amax, and when the first position data A is less than or greater than the range from 0 to Amax, the value ranging from 0 to Amax turns out to be repeated. The range in which the value of data is available in such a way is called a data range, here. Usually, the data range is selected so as to coincide with the position resolution capability of the motor M. Namely, when the first width in bits is a 16-bit width, the data range ranges from 0 to 65535. In addition, responding to this, one rotation of the motor M is associated with the range from 0 to 65535, and the value of the first position data A turns out to indicate the absolute position of the motor M.

On the other hand, as illustrated in FIG. 3, the first position data A is intermittently calculated in a temporally spaced and discontinuous manner. The calculation timing of the first position data A is also called "sampling timing". In addition, while the interval of the sampling timing tn (n is an integer number) depends on the detection timing of the detection signal D, the conversion timing of the analog-digital conversion, a time necessary for the position data calculation processing, and the like, the interval is not limited to a specific interval.

As described above, with respect to each sampling timing tn, the first position data calculator 120 sequentially calculates the first position data A in the data range according to the first width in bits. In addition, in the case of the present embodiment, the first position data A indicates a position (1× absolute position) within one rotation of the motor M, and has a value repeating within the data range. Hereinafter, a case will be arbitrarily exemplified and described in which the first position data A is processed as the data type of "unsigned short integer type (unsigned short)" (namely, the width in bits thereof is a 16-bit width).

In this regard, however, the calculation method for the first position data A, based on the first position data calculator 120, the width in bits of the first position data A, the range (in the above-mentioned example, one rotation) of the position of the motor M, indicated by the repetition of the first position data A, and the like are not limited to specific ones. It is additionally remarked that, in other words, if a configuration is adopted in which the first position data calculator 120 digitally expresses the position of the detection target M as the first position data A, on the basis of the detection signal D, and calculates data having a value repeated with a predetermined width in bits, the configuration is not limited to a specific configuration.

Here, an output timing tr that is a timing at which the final position data X is output from the encoder 100, or the like will be described. As described above, the first position data A is calculated at the discrete sampling timing tn. However, a position necessary for the control device CT is not limited to a position at the sampling timing tn. Therefore, the control device CT outputs a request signal R to the encoder 100. A timing at which the request signal R is output or a timing indicated by the request signal R is also called the output timing tr, here. When there is a time difference between the output timing tr and the sampling timing tn, the encoder 100 obtains an approximation function (for example, a regression line or the like) that derives position data when timing data is input, on the basis of position data or the like calculated at a past sampling timing. In addition, the encoder 100 calculates the position data X at the output timing tr, from the approximation function and the output timing tr, and outputs the position data X to the control device CT.

However, as illustrated in FIG. 3, a case may occur where a data change point Ti, at which the first position data A exceeds the data range and data becomes largely spaced, is included in a plurality of past sampling timings used for calculating the approximation function. In this case, as illustrated in FIG. 3, an approximation function FA calculated from these pieces of data does not indicate the actual first position data A. Accordingly, in this case, it may be difficult for the encoder 100 to output the correct position data X to the control device CT.

In order to prevent such false detection and stably output the correct position data X, the encoder 100 calculates a correct approximation function using the first data converter 130 or the like. Therefore, hereinafter, the first data converter 130 and the like will be described in detail.

The first data converter 130 is an example of the first data converter, and converts the first position data A into a second position data B whose width in bits is longer than that of the first position data A, so as to obtain the more accurate approximation function (for example, cast processing or the like). In addition, the approximation unit 140 described later obtains the approximation function on the basis of pieces of the second position data Bn−m, Bn−m+1, . . . , Bn (=B0, B1, . . . , Bm) at plural sampling timings tn−m, tn−m+1, . . . , tn (=t0, t1, . . . , tm), converted in the first data converter 130.

In addition, here, a case will be cited as an example and described in which data at a latest sampling timing is indicated by a subscript n and the approximation function is obtained from m pieces of past data. Namely, the latest sampling timing is tn, and the first position data and the second position data in such case are An and Bn, respectively. On the other hand, a sampling timing, located m sampling timings back, is tn−m, and the first position data and the second position data in such case are An−m and Bn−m, respectively.

As illustrated in FIG. 2, as an example, the first data converter 130 includes a speed data calculator 131, a position memory 132, a second position data calculator 133, and a speed memory 134 so as to perform the conversion of a width in bits.

The first data converter 130 acquires the first position data A calculated in the first position data calculator 120, and records the first position data A in the position memory 132.

In this case, at least m pieces of the first position data An−m to An−1 are stored backward in the position memory 132. In addition, when the latest first position data An is calculated, the latest first position data An is stored, as the past first position data, in the position memory 132, and the first position data An−m is erased, as unnecessary data, from the position memory 132. In this regard, however, the position memory 132 may also include a buffer having a certain amount of capacity and store and maintain unnecessary data (namely, the first position data at a sampling timing, located m or more sampling timings back), for example.

Figure 4:
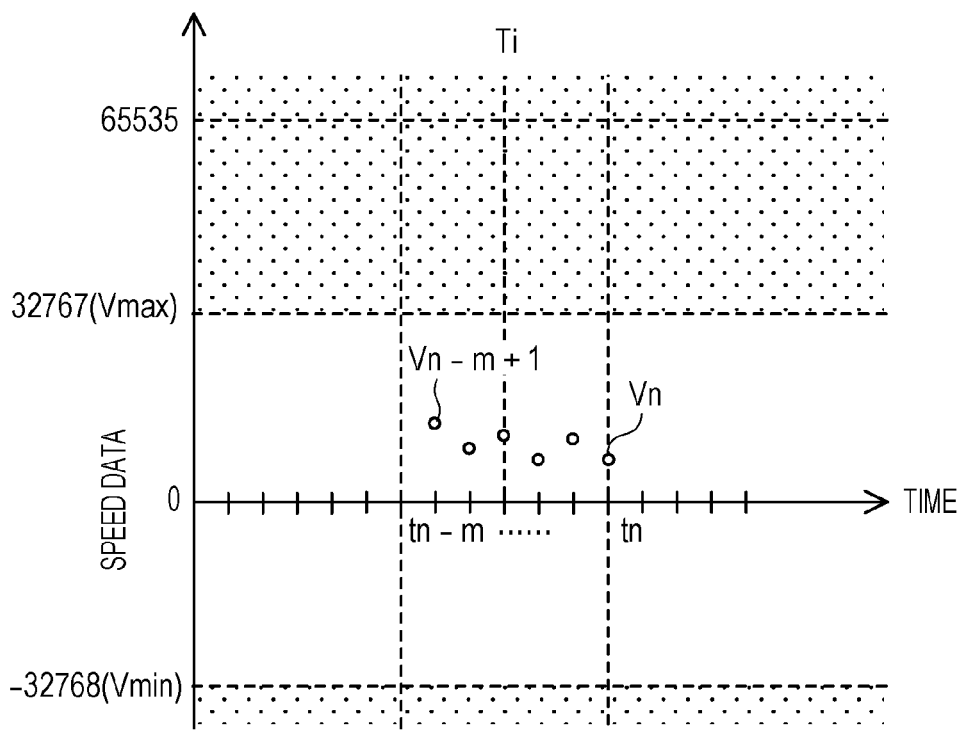
FIG. 4 is an explanatory diagram for explaining processing performed in the encoder according to the embodiment.

The speed data calculator 131 calculates the speed of the motor M on the basis of the first position data calculated by the first position data calculator 120. Data indicating the speed calculated by the speed data calculator 131 is also called speed data V, here. FIG. 4 illustrates the temporal change of the speed data V. When the latest first position data An is calculated in the first position data calculator 120, the speed data calculator 131 calculates the speed Vn of the motor M at the sampling timing tn thereof. In addition, at the calculation of the speed Vn, the speed data calculator 131 may use past positions An−m to An−1 stored in the position memory 132.

As the calculation method for the speed data V, based on the speed data calculator 131, various methods may be considered. For example, when the speed data Vn at the latest sampling timing tn is calculated, the first position data An−1 at the previous sampling timing tn−1 is subtracted from the latest first position data An, and thereby it is possible to calculate the speed data Vn. In this case, the speed data Vn corresponds to the amount of change per sampling timing interval. Accordingly, compared with a case in which the speed data Vn is calculated using the first position data A at another sampling timing, it is not necessary to consider a time interval between both sampling timings, and hence processing is easy. In addition, in this case, it is possible to sequentially calculate the speed data V every time the first position data calculator 120 calculates the first position data A.

In addition, the speed data calculator 131 calculates the speed data V as signed data whose sign (+/−) indicates a rotation direction. Therefore, the speed data calculator 131 subtracts the first position data An−1 from the first position data An, the first position data An−1 and the first position data An being unsigned data of the first width in bits, and defines an MSBit as a sign bit. Accordingly, the speed data calculator 131 treats the subtraction result as signed data of the first width in bits. When the width in bits is a 16-bit width, the data range (Vmin to Vmax) of the speed data V turns out to range from −32768 to 32767.

The calculated speed data Vn is output to the second position data calculator 133, and sequentially recorded in the speed memory 134.

At least (m−2) pieces of speed data Vn−m+1 to Vn−1 are stored backward in the speed memory 134. In addition, when the latest speed data Vn is calculated, the latest speed data Vn is recorded, as past speed data, in the speed memory 134, and the speed data Vn−m+1 is erased, as unnecessary data, from the speed memory 134. In this regard, however, the speed memory 134 may also include a buffer having a certain amount of capacity and store and maintain unnecessary data (namely, the speed data at a sampling timing, located (m−1) or more sampling timings back), for example.

The second position data calculator 133 acquires the first position data An=m (the first width in bits) at the reference sampling timing tn−m located m sampling timings back, recorded in the position memory 132, and converts the first position data An−m into signed data (also referred to as "second position data B") whose second width in bits is at least two bits longer than the first position data An−m. It is assumed that data subjected to this conversion is second position data Bn−m.

In addition, the second position data calculator 133 acquires pieces of speed data Vn−m+1 to Vn corresponding to sampling timings tn−m+1 to tn from the speed memory 134 and the speed data calculator 131. After that, the second position data calculator 133 converts these pieces of speed data into pieces of signed data of the second width in bits.

Figure 5:
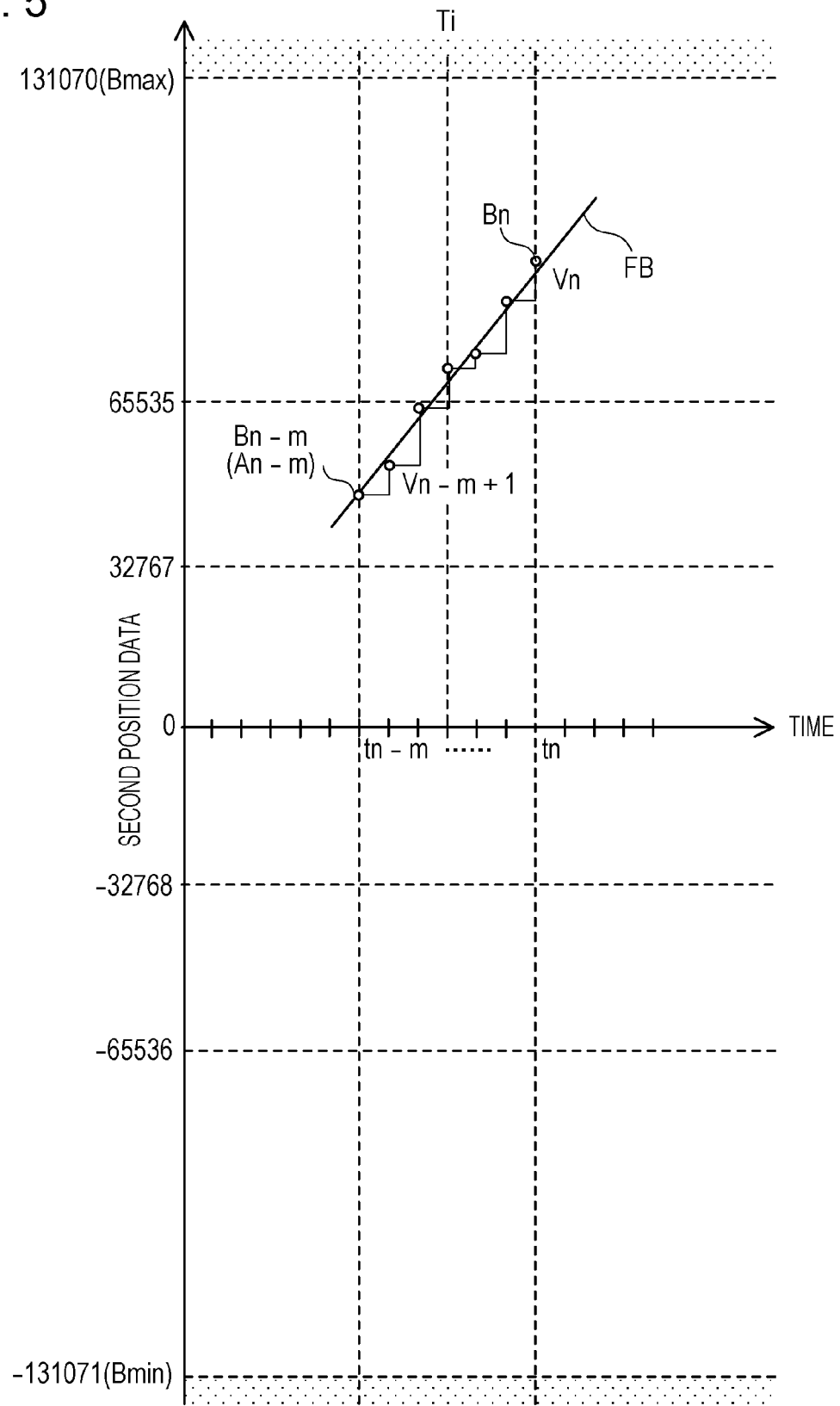
FIG. 5 is an explanatory diagram for explaining processing performed in the encoder according to the embodiment.

Next, the second position data calculator 133 sequentially adds the pieces of the speed data Vn−m+1 to Vn to the second position data Bn−m at the reference sampling timing tn−m, and thereby calculates pieces of the second position data Bn−m+1 to Bn at the sampling timings tn−m+1 to tn. Accordingly, the second position data calculator 133 can output, to the approximation unit 140, the pieces of the second position data Bn−m to Bn indicating the position of the motor M with the second width in bits. In addition, examples of the pieces of the second position data Bn−m to Bn are illustrated in FIG. 5. As illustrated in FIG. 5, when the second width in bits is a 18-bit width, the data range (Bmin to Bmax) of the second position data B ranges from −131071 to 131070.

In addition, here, a case is described in which the second width in bits of the second position data B is two or more bits longer than that of the first width in bits. However, when the width in bits is extended only by one bit, the data range is expanded in such a manner that data is unsigned on a plus side and signed on a minus side. Accordingly, for example, in such a case that the rotation direction is constant, it is only necessary to simply expand data on the plus side or the minus side, and hence the extension of the width in bits by one bit may also be accepted. In this regard, however, when signed data of 2-bit or more width is used as the second position data B as illustrated in the present embodiment, the data range is adequately expanded on both the plus side and the minus side, and hence it is possible to double the stability thereof.

The approximation unit 140 subjects, to regression analysis, pieces of the second position data Bn−m to Bn at two or more successive sampling timings tn−m to tn, and calculates an approximation function FB that derives position data (also referred to as "third position data C") when timing data indicating a timing (time) is input. Namely, the approximation unit 140 subjects, to the regression analysis, m pieces of position data that are the pieces of the second position data Bn−m to Bn, at the sampling timing tn, and calculates the constants (for example, a slope and an intercept in the case of a regression line) of the approximation function FB. An image of the approximation function FB calculated by the approximation unit 140 is illustrated in FIG. 5.

While, in the present embodiment, as an example of the regression analysis, a case will be described in which linear regression analysis is used, higher regression analysis may also be used as another example of the regression analysis. In addition, in the present embodiment, as an example of the regression analysis method, it is possible to use a least-square method. However, if a regression analysis method is a method that is linear and capable of deriving a linear function or is nonlinear and capable of deriving a nonlinear function, the regression analysis method is not limited to a specific one.

When a new sampling timing tn arrives, the first position data calculator 120 calculates new first position data A, and the first data converter 130 outputs a set of new second position data B including up to a sampling timing tn−m located m sampling timings back. On the other hand, the approximation unit 140 updates the approximation function FB every time the set is acquired.

When having acquired the request signal R from the control device CT, the third position data calculator 150 inputs, to the approximation function FB, timing data indicating a timing at which the request signal R has been acquired or a timing (output timing, request timing) tr indicated by the request signal R, and derives the position data (also referred to as "third position data C") of the motor M at the request timing tr. The third position data calculator 150 derives the third position data C as signed data having the same second width in bits as the second position data B.

Figure 6:
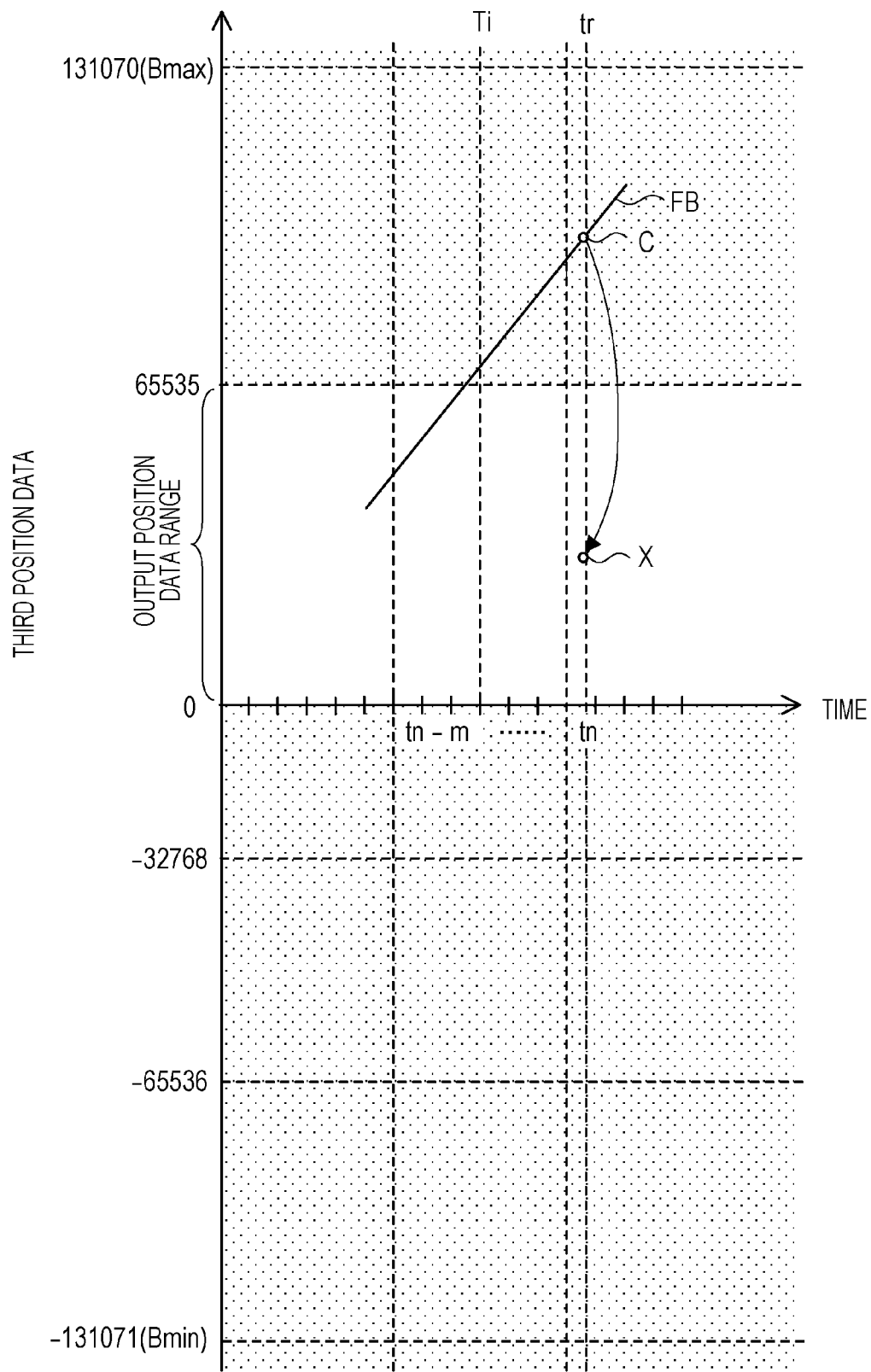
FIG. 6 is an explanatory diagram for explaining processing performed in the encoder according to the embodiment.

The second data converter 160 is an example of the second data converter, and as illustrated in FIG. 6, converts the third position data C derived by the third position data calculator 150, thereby converting the third position data C into a data type requested by the control device CT (for example, cast processing or the like). In this case, in many cases, the data type of data calculated by the first position data calculator 120 is equal to the data type requested by the control device CT. Therefore, in the case of the present embodiment, the second data converter 160 converts the third position data C into a data type equal to that of the first position data, namely, unsigned data of the first width in bits. The data subjected to this conversion is also referred to as an output position data X.

In addition, for example, when the third position data C is signed 18-bit data, for example, and the output position data X is unsigned 16-bit data, the conversion from the third position data C to the output position data X may be performed by deleting upper 2 bits (18th bit to 17th bit).

Operations of Encoder Etc.

The configurations of the encoder 100 and the like according to the present embodiment have been described above.

Figure 7:
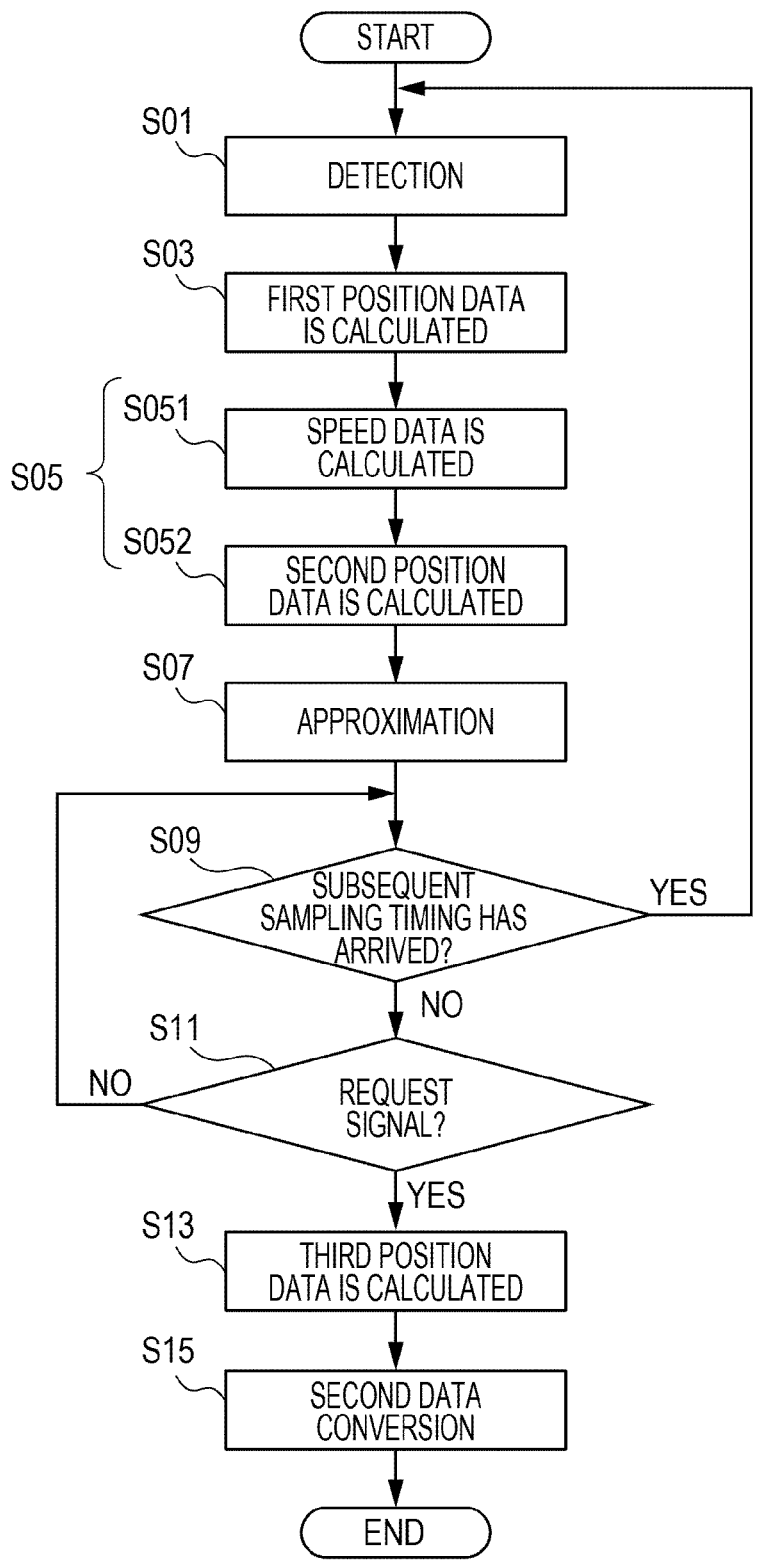
FIG. 7 is an explanatory diagram for explaining an operation of the encoder according to the embodiment.

Next, the operations of the encoder 100 and the like according to the present embodiment will be described with reference to FIG. 7. FIG. 7 is an explanatory diagram for explaining the operation of the encoder according to the present embodiment.

As illustrated in FIG. 7, first, the encoder 100 processes Step S01.

In this Step S01 (an example of a detecting step), the detector 110 detects the position of the motor M, and acquires the detection signal D indicating the position. In addition, the processing proceeds to Step S03.

In Step S03 (an example of a first position data calculating step), the first position data calculator 120 calculates the first position data A indicating the position of the motor M with the first width in bits, on the basis of the detection signal D detected by the detector 110. In addition, the processing proceeds to Step S05.

In Step S05 (an example of a first data converting step), the first data converter 130 converts the first position data A into the second position data B having the second width in bits longer than that of the first position data A. In addition, describing this Step S05 in detail, Step S05 is separated into Step S051 and Step S052, and Step S051 is processed first.

In Step S051 (an example of a speed data calculating step), the speed data calculator 131 calculates the speed data Vn at the sampling timing tn on the basis of the first position data An at the sampling timing tn, calculated in Step S03, and the first position data An−1 at the sampling timing tn−1 previous to the sampling timing tn. In addition, the processing proceeds to Step S052.

In Step S052 (an example of a second position data calculating step), the second position data calculator 133 calculates pieces of the second position data Bn−m to Bn at the plural sampling timings tn−m to tn, which indicate the position of the motor M with the second width in bits, on the basis of pieces of the speed data Vn−m+1 to Vn including past pieces of the speed data calculated in Step S051 and the first position data An−m calculated in Step S03 at a past time. In addition, the processing proceeds to Step S07.

In Step S07 (an example of an approximating step), the approximation unit 140 subjects, to the regression analysis, a data set (pieces of the second position data Bn−m to Bn) calculated in Step S052, thereby calculating the approximation function FB. In addition, the processing proceeds to Step S09.

In Step S09, it is confirmed whether or not a subsequent sampling timing tn+1 has arrived. In addition, when the subsequent sampling timing tn+1 has arrived, the processing following Step S01 is repeated, and when the subsequent sampling timing tn+1 has not arrived yet, the processing proceeds to Step S11.

In Step S11, it is confirmed whether or not the second position data calculator 150 has acquired the request signal R from the control device CT. When no request signal R has been acquired, Step S09 is repeatedly processed. On the other hand, when the request signal R has been acquired, Step S13 is processed.

In Step S13 (an example of a third position data calculating step), the third position data calculator 150 inputs, to the approximation function FB calculated in Step S07, timing data indicating a timing at which the request signal R has been acquired or a timing (output timing, request timing) tr indicated by the request signal R, and derives the third position data C indicating the position of the motor M at the output timing tr with the second width in bits. In addition, the processing proceeds to Step S15.

In Step S15 (an example of a second data converting step), the second data converter 160 converts the third position data C derived in Step S13 into a data type (for example, data of the first width in bits) requested by the control device CT, and outputs the output position data X subjected to the conversion to the control device CT. While, in this Step S15, a flow leading to the delivery of one piece of the output position data X is finished, usually the processing following Step S01 is repeated when a subsequent sampling timing tn+1 has arrived subsequent to the processing in Step S15.

Examples of Advantageous Effects According to Present Embodiment

The encoder 100 and the like according to the present embodiment have been described above.

According to the encoder 100 and the like, when the approximation function is calculated, the first position data calculated by the first position data calculator 120 is converted into the second position data of the second width in bits longer than the first width in bits thereof, and the approximation function is calculated from the second position data. Accordingly, the data range is widened, and it is possible to derive correct position data that is not influenced by restriction on the upper limit or lower limit of the data range.

In addition, in this case, according to the encoder 100, when the width in bits is increased, data conversion is performed using speed data at each piece of position data. Accordingly, it is possible to change a data set, used at the time of the derivation of the approximation function, to a data set that does not include the data change point Ti at which data greatly changes. Accordingly, it is possible to calculate a more accurate approximation function.

Obviously, numerous modifications and variations of the present invention are possible in light of the above teachings. It is therefore to be understood that within the scope of the appended claims, the invention may be practiced otherwise than as specifically described herein.

In addition, in the present specification, steps described in the flowchart include not only processing performed in chronological order in accordance with the described sequence but also processing executed in parallel or individually even if the steps are not necessarily processed in chronological order. In addition, it should be understood that, with respect to even steps processed in chronological order, the sequence thereof may also be arbitrarily changed in some case.

What is claimed is:

1. An encoder comprising:
   a detector configured to detect a detection signal indicating a position of a detection target;
   a first position data calculator configured to calculate, at a discrete sampling timing based on the detection signal detected by the detector, first position data that has a first width in bits and that indicates the position of the detection target;
   a first data converter configured to convert the first position data calculated by the first position data calculator into second position data whose second width in bits is longer than the first width in bits;
   an approximation device configured to calculate an approximation function that derives position data when timing data is input, based on a plurality of the second position data converted by the first data converter at a plurality of successive sampling timings, respectively; and
   a third position data calculator configured to calculate third position data indicating the position of the detection target at an output timing, based on the approximation function calculated by the approximation device.

2. The encoder according to claim 1, wherein the first data converter comprises
   a speed data calculator configured to calculate speed data indicating movement speed of the detection target based on the first position data calculated by the first position data calculator, and
   a second position data calculator configured to calculate second position data indicating the position of the detection target with the second width in bits, based on the speed data calculated by the speed data calculator.

3. The encoder according to claim 2, wherein
   the second position data calculator converts, to second reference position data of the second width in bits, the first position data at a first reference sampling timing located m sampling timings back (m is an integer number greater than or equal to two) when the speed data at a latest sampling timing is calculated,
   the second position data calculator is configured to calculate, with the second width in bits, the second position data at each of sampling timings ranging from a second reference sampling timing located (m−1) sampling timings back, to the latest sampling timing, based on the second reference position data and each of speed data at the sampling timings ranging from the second reference sampling timing located (m−1) sampling timings back, to the latest sampling timing, and
   the approximation device is configured to calculate the approximation function based on the second reference position data at the first reference sampling timing located m sampling timings back and the second position data at each of the sampling timings ranging from the second reference sampling timing located (m−1) sampling timings back, to the latest sampling timing.

4. The encoder according to claim 1, further comprising:
   a second data converter configured to convert the third position data into position data of the first width in bits, the third position data calculator being configured to calculate the third position data with a third width in bits longer than the first width in bits.

5. A servo unit comprising:
   a motor to move a detection target;
   an encoder configured to detect a position of the detection target and comprising:
   a detector configured to detect a detection signal indicating the position of the detection target;
   a first position data calculator configured to calculate, at a discrete sampling timing based on the detection signal detected by the detector, first position data that has a first width in bits and that indicates the position of the detection target;
   a first data converter configured to convert the first position data calculated by the first position data calculator into second position data whose second width in bits is longer than the first width in bits;
   an approximation device configured to calculate an approximation function that derives position data when timing data is input, based on a plurality of the second position data converted by the first data converter at a plurality of the successive sampling timings, respectively; and
   a third position data calculator configured to calculate third position data indicating the position of the detection target at an output timing, based on the approximation function calculated by the approximation device; and
   a controller configured to control the motor based on position data detected by the encoder.

6. The servo unit according to claim 5, wherein the first data converter comprises
   a speed data calculator configured to calculate speed data indicating movement speed of the detection target based on the first position data calculated by the first position data calculator, and
   a second position data calculator configured to calculate second position data indicating the position of the detection target with the second width in bits, based on the speed data calculated by the speed data calculator.

7. The servo unit according to claim 6, wherein
   the second position data calculator converts, to second reference position data of the second width in bits, the first position data at a first reference sampling timing located m sampling timings back (m is an integer number greater than or equal to two) when the speed data at a latest sampling timing is calculated,
   the second position data calculator calculates, with the second width in bits, the second position data at each of sampling timings ranging from a second reference sampling timing located (m−1) sampling timings back, to the latest sampling timing, based on the second reference position data and each of speed data at the sampling timings ranging from the second reference sampling timing located (m−1) sampling timings back, to the latest sampling timing, and
   the approximation device calculates the approximation function based on the second reference position data at the first reference sampling timing located m sampling timings back and the second position data at each of the sampling timings ranging from the second reference sampling timing located (m−1) sampling timings back, to the latest sampling timing.

8. The servo unit according to claim 5,
   wherein the third position data calculator is configure to calculate the third position data with a third width in bits longer than the first width in bits, and
   wherein the encoder further includes the second data converter configured to convert the third position data into position data of the first width in bits.

9. A method comprising:
   detecting a detection signal indicating a position of a detection target that is movable using a motor;

calculating, at a discrete sampling timing based on the detection signal, first position data that has a first width in bits and that indicates the position of the detection target;
converting the first position data into second position data whose second width in bits is longer than the first width in bits;
calculating an approximation function that derives position data when timing data is input, based on a plurality of the second position data at a plurality of the successive sampling timings, respectively;
calculating third position data indicating the position of the detection target at an output timing, based on the approximation function; and
providing a control device that controls the motor based on the third position data.

10. An encoder comprising:
detection means for detecting a detection signal indicating a position of a detection target;
first position data calculation means for calculating, at a discrete sampling timing based on the detection signal detected by the detection means, first position data that has a first width in bits and that indicates the position of the detection target;
first data conversion means for converting the first position data calculated by the first position data calculation means into second position data whose second width in bits is longer than the first width in bits;
approximation means for calculating an approximation function that derives position data when timing data is input, based on a plurality of the second position data converted by the first data conversion means at a plurality of successive sampling timings, respectively; and
third position data calculation means for calculating third position data indicating the position of the detection target at an output timing, based on the approximation function calculated by the approximation means.

* * * * *